United States Patent
Lin et al.

(10) Patent No.: US 11,048,909 B2
(45) Date of Patent: Jun. 29, 2021

(54) FULL-SCREEN ELECTRONIC DEVICE WITH FINGERPRINT SENSING FUNCTION AND FINGERPRINT SENSING METHOD THEREOF

(71) Applicants: Egis Technology Inc., Taipei (TW); Igistec Co., Ltd., Hsinchu County (TW)

(72) Inventors: Yu-Hsuan Lin, Hsinchu County (TW); Tang-Hung Po, Hsinchu County (TW); Chung-Yi Wang, Hsinchu County (TW)

(73) Assignees: Egis Technology Inc., Taipei (TW); Igistec Co., Ltd., Hsinchu (TW)

(*) Notice: Subject to any disclaimer, the term of this patent is extended or adjusted under 35 U.S.C. 154(b) by 44 days.

(21) Appl. No.: 16/538,124

(22) Filed: Aug. 12, 2019

(65) Prior Publication Data
US 2020/0097700 A1 Mar. 26, 2020

Related U.S. Application Data

(60) Provisional application No. 62/734,270, filed on Sep. 21, 2018.

(30) Foreign Application Priority Data

Jul. 5, 2019 (CN) .......................... 201910605259.1

(51) Int. Cl.
*G06K 9/00* (2006.01)
*G06F 3/041* (2006.01)

(52) U.S. Cl.
CPC ....... *G06K 9/00087* (2013.01); *G06K 9/0002* (2013.01); *G06K 9/0004* (2013.01); *G06F 3/041* (2013.01)

(58) Field of Classification Search
CPC ............. G06K 9/00087; G06K 9/0002; G06K 9/0004; G06F 3/041; G06F 3/041661
See application file for complete search history.

(56) References Cited

U.S. PATENT DOCUMENTS

2014/0359756 A1* 12/2014 Alameh .............. G06F 3/04886 726/19
2017/0123555 A1* 5/2017 Kim ................... G06K 9/00013
2018/0224999 A1* 8/2018 Lee ....................... G06F 3/0488

* cited by examiner

Primary Examiner — Stephen G Sherman
(74) Attorney, Agent, or Firm — JCIPRNET

(57) ABSTRACT

A full-screen electronic device with a fingerprint sensing function and a fingerprint sensing method are provided. The full-screen electronic device includes a panel module, a plurality of fingerprint sensors and a control unit. The plurality of fingerprint sensors are aligned with the panel module and distributed into a plurality of scan regions in an array. The fingerprint sensing method includes the following steps. Firstly, a concerned information about a concerned position of the display panel is generated. After the control unit receives the concerned information, the control unit defines the scan regions of the concerned position as a first scan set according to the concerned information. Then, the control unit controls the fingerprint sensors corresponding to the first scan set according to a first scan strategy.

11 Claims, 5 Drawing Sheets

FULL-SCREEN ELECTRONIC DEVICE WITH FINGERPRINT SENSING FUNCTION AND FINGERPRINT SENSING METHOD THEREOF

CROSS-REFERENCE TO RELATED APPLICATION

This application claims priority to U.S. Provisional Patent Application No. 62/734,270 filed Sep. 21, 2018 and Chinese Patent Application No. 201910605259.1 file Jul. 5, 2019, the contents of which are incorporated herein by reference.

FIELD OF THE INVENTION

The present invention relates to a full-screen electronic device and a fingerprint sensing method thereof, and more particularly to an electronic device and a sensing method for shortening the time period of scanning the fingerprint.

BACKGROUND OF THE INVENTION

Recently, biometric identification technologies are important subjects of various industries in order to ensure information security. As known, a fingerprint identification technology is one of the widely-used biometric identification technologies.

A fingerprint is a pattern composed of many curvy lines. In the enlarged view, these lines are lumpy because these lines include alternate ridges and valleys. A fingerprint feature indicates the distribution of these lumpy lines. Generally, everyone has the unique fingerprint feature. The uniqueness of the fingerprint feature can be used as a basis of recognizing the identity.

Generally, the memory space for storing the image or data of the fingerprint is limited. Consequently, more mobile electronic devices or laptops are equipped with fingerprint identification modules. According to the fingerprint identification technologies, the structure or image of the fingerprint is acquired and then calculated, compared and analyzed through algorithms. Consequently, the identity of the user can be recognized.

Nowadays, since the demands on the full-screen smart phones gradually increase, a fingerprint on display (FOD) identification technology or an under-display fingerprint identification technology becomes the mainstream in the market.

Since the whole display screen is recognizable by using the under-display fingerprint identification technology, the user's finger can be placed on any position of the display screen while the fingerprint is sensed. However, the conventional under-display fingerprint identification technology still has some drawbacks. For example, whenever the user's finger is placed on the display screen, it is necessary for all fingerprint sensors to scan the whole display to acquire the fingerprint image. As known, the area of the finger is much smaller than the area of the whole display screen. For acquiring the image of the finger, it is necessary to scan the whole display screen according to the conventional technology. In other words, the conventional fingerprint identification method is time-consumed.

Therefore, there is a need of providing an improved fingerprint sensing method for shortening the time period of scanning the fingerprint.

SUMMARY OF THE INVENTION

An object of the present invention provides a full-screen electronic device and a fingerprint sensing method thereof. Especially, the electronic device and the fingerprint sensing method sense a concerned position. Consequently, the scanning process is shortened, and the time period of scanning the fingerprint is saved.

In accordance with an aspect of the present invention, a fingerprint sensing method for a full-screen electronic device is provided. The full-screen electronic device includes a panel module, a plurality of fingerprint sensors and a control unit. The plurality of fingerprint sensors are aligned with the panel module and distributed into a plurality of scan regions in an array. The fingerprint sensing method includes the following steps. Firstly, a concerned information about a concerned position of the display panel is generated. After the control unit receives the concerned information, the control unit defines the scan regions of the concerned position as a first scan set according to the concerned information. Then, the control unit controls the fingerprint sensors corresponding to the first scan set according to a first scan strategy.

In accordance with another aspect of the present invention, a full-screen electronic device with a fingerprint sensing function is provided. The full-screen electronic device includes a panel module, a plurality of fingerprint sensors and a control unit. The panel module generates a concerned information about a concerned position of the display panel. The plurality of fingerprint sensors is located under the panel module, and distributed into a plurality of scan regions in an array. The control unit is electrically coupled to the panel module and the plurality of fingerprint sensors. After the control unit receives the concerned information, the control unit defines the scan regions of the concerned position as a first scan set according to the concerned information, and controls the fingerprint sensors corresponding to the first scan set according to a first scan strategy.

BRIEF DESCRIPTION OF THE DRAWINGS

The above objects and advantages of the present invention will become more readily apparent to those ordinarily skilled in the art after reviewing the following detailed description and accompanying drawings, in which.

DETAILED DESCRIPTION OF THE PREFERRED EMBODIMENT

The present invention will now be described more specifically with reference to the following embodiments. It is to be noted that the following descriptions of preferred embodiments of this invention are presented herein for purpose of illustration and description only. It is not intended to be exhaustive or to be limited to the precise form disclosed.

Figure 1A:
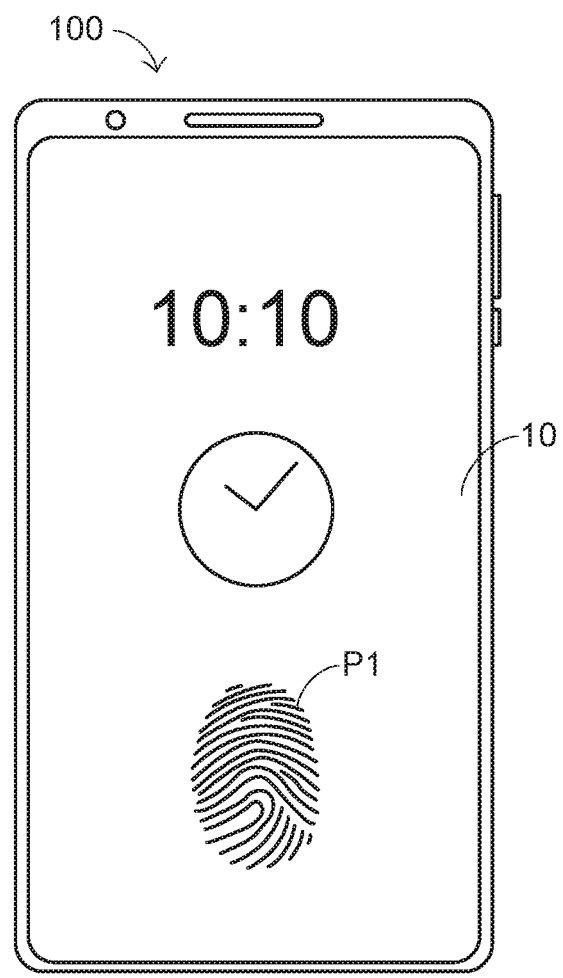
FIG. 1A schematically illustrates the appearance of a conventional full-screen electronic device.
Figure 1B:
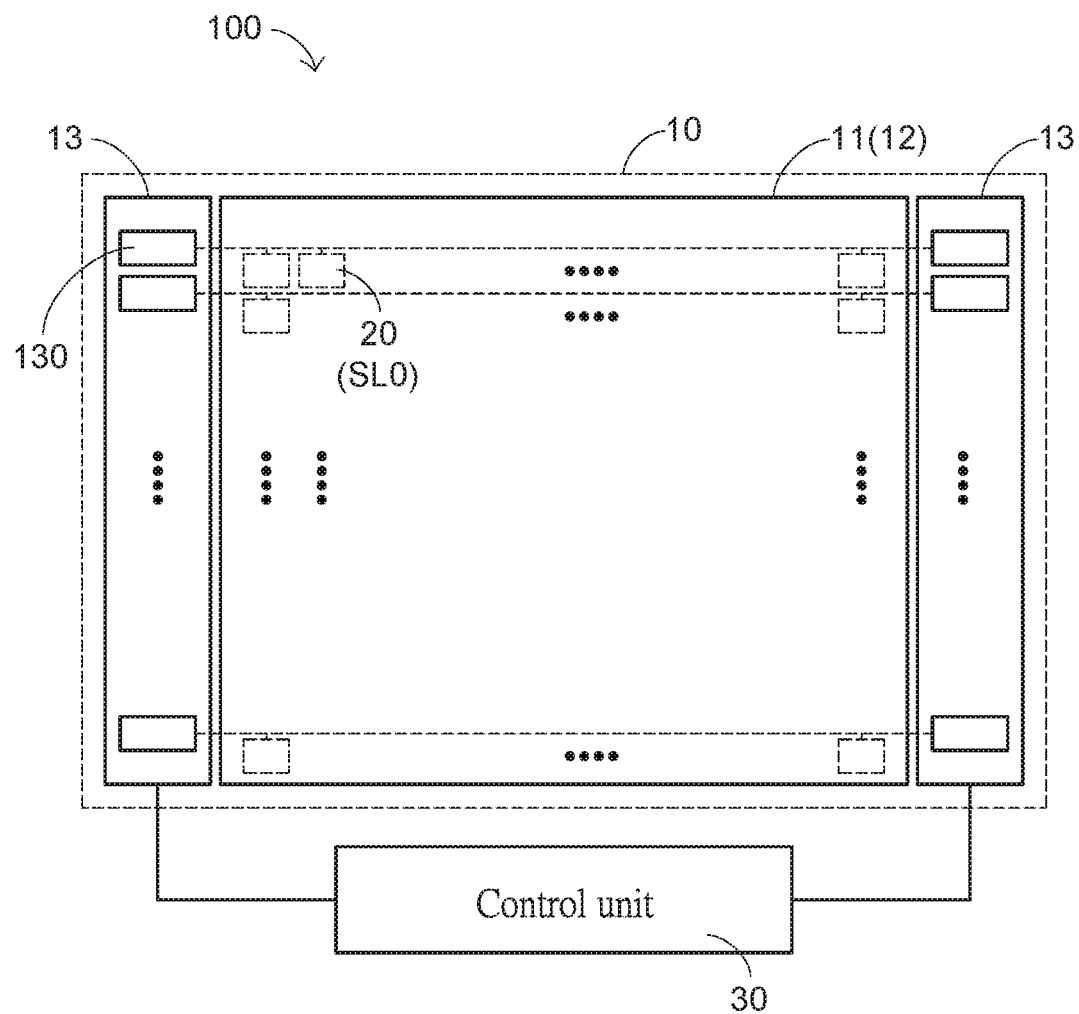
FIG. 1B is a schematic circuit diagram illustrating the hardware layout of the full-screen electronic device as shown in FIG. 1A.

Please refer to FIGS. 1A and 1B. FIG. 1A schematically illustrates the appearance of a conventional full-screen electronic device. FIG. 1B is a schematic circuit diagram illustrating the hardware layout of the full-screen electronic device as shown in FIG. 1A. As shown in FIGS. 1A and 1B, the full-screen electronic device 100 includes a panel module 10, a plurality of fingerprint sensors 20 and a control unit 30. The fingerprint sensors 20 are located under the panel module 10. The control unit 30 is electrically coupled to the panel module 10. Moreover, the control unit 30 is electrically coupled to the fingerprint sensors 20 through a scan driving module 13.

The panel module 10 includes a touch panel 11 and a display panel 12. The touch panel 11 is located over the display panel 12 so as to be touched by the user. The size and shape of the touch panel 11 match the size and shape of the display panel 12. The plurality of fingerprint sensors 20 are arranged into an array and located under the panel module 10. The installation position of the fingerprint sensors 20 is aligned with a touch-sensitive region of the touch panel 11. The scan driving module 13 is divided into two parts. The two parts of the scan driving module 13 are arranged beside two sides of the touch panel 11 and electrically coupled to the fingerprint sensors 20 and the control unit 30.

Figure 2:
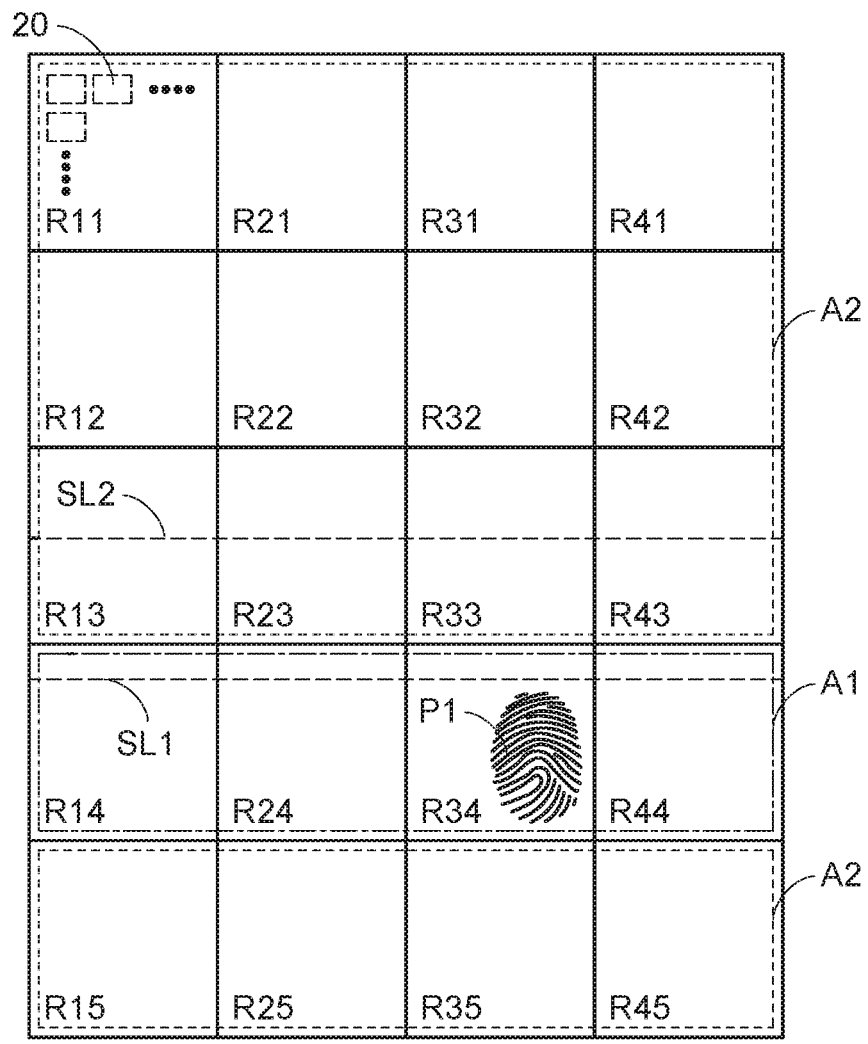
FIG. 2 schematically illustrates the distribution of scan regions defined by a fingerprint sensing method according to an embodiment of the present invention.

FIG. 2 schematically illustrates the distribution of scan regions defined by a fingerprint sensing method according to an embodiment of the present invention. In this context, the concerned position P1 denotes the position of the user's finger on the panel module 10 (or the touch panel 11). That is, the concerned position P1 is a region of interest (ROI) for the fingerprint sensing method of the present invention. Hereinafter, the region of interest is also referred as a ROI area, and the other regions are also referred as a non-ROI area. When the fingerprint sensing method is performed, only the area related to the ROI area or the concerned position P1 is scanned, but the non-ROI area is not scanned.

The fingerprint sensing method is executed by a firmware that is installed in the full-screen electronic device 100. Alternatively, the fingerprint sensing method is executed by a sensing program that is stored in a flash memory (not shown) of the full-screen electronic device 100. For example, when the user's finger is placed on the touch panel 11, the firmware or the sensing program is executed to start the sensing task. The steps of the fingerprint sensing method will be described in more details later.

Please refer to FIG. 1B and FIG. 2. In an embodiment, the plurality of fingerprint sensors 20 are aligned with the panel module 10 and distributed into a plurality of scan regions in an array. For example, the plurality of scan regions R11~R45 are defined by four horizontal scan regions and five vertical scan regions collaboratively. That is, the plurality of fingerprint sensors 20 in the array arrangement are located under the panel module 10, and the fingerprint sensors 20 are assigned to the corresponding scan regions. Each scan region contains a plurality of fingerprint sensors 20. Preferably, the size of each scan region is related to the size of the general finger.

In an embodiment, these scan regions have the same sizes. That is, the number of the fingerprint sensors 20 in each scan region is identical. It is noted that the sizes of the scan regions are not restrictedly identical. That is, the sizes of the scan regions may be adjusted according to the practical requirements. Since the entire of the panel module 10 has the fingerprint identification function, the concerned position may be completely included in a specified scan region or included in two or more scan regions.

Figure 3:
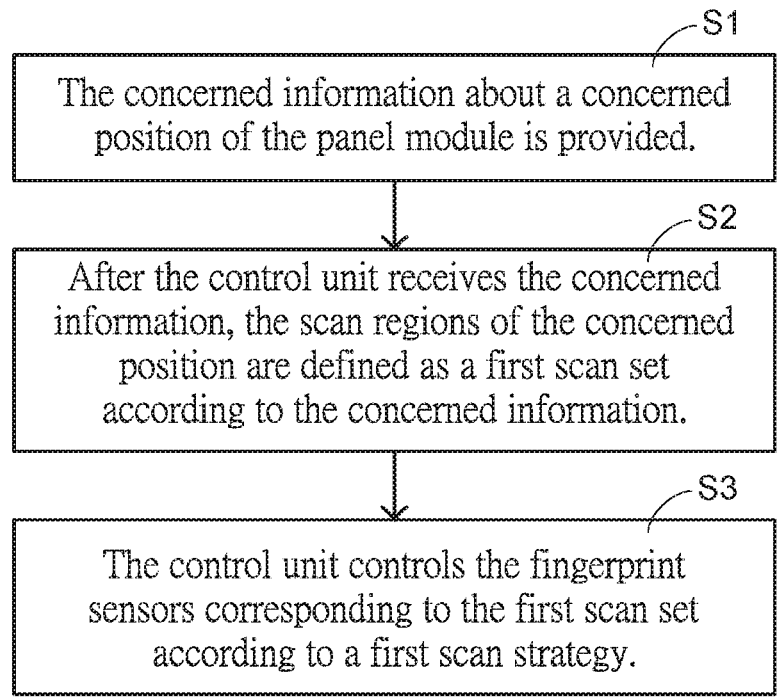
FIG. 3 is a flowchart of a fingerprint sensing method according to an embodiment of the present invention.

FIG. 3 is a flowchart of a fingerprint sensing method according to an embodiment of the present invention. Since the touch panel 11 provides the touch control function, the touch panel 11 can effectively sense the touch operation of the finger. That is, the touch panel 11 can accurately realize whether the finger is placed on the touch panel 11 and recognize the placed position of the finger. The fingerprint sensing method includes the following steps. In a step S1, the concerned information about a concerned position P1 of the panel module 10 is provided by the touch panel 11. For example, the concerned information includes the corresponding coordinate of the panel module 10 (or the touch panel 11) or the corresponding column/row number. After the control unit 30 receives the concerned information, the scan regions of the concerned position P1 are defined as a first scan set A1 according to the concerned information (Step S2). For example, the scan regions of the concerned position P1 contain the scan regions in the row corresponding to the scan region R34. Then, the control unit 30 controls the fingerprint sensors 20 corresponding to the first scan set A1 according to a first scan strategy (Step S3). It is noted that the concerned position P1 is not a point only. In an embodiment, the size of the concerned position P1 is substantially equal to the size of a finger, and the concerned position P1 is a rectangular zone composed of four points.

In the step S2, the control unit 30 realizes the location of the concerned position P1 according to the concerned information. In the example of FIG. 2, the concerned position P1 is included in the scan region R34. In addition to the scan region R34, the scan regions of the concerned position P1 further includes the scan regions in the same row with the scan region R34 (e.g., R14, R24 and R44). In this embodiment, the scan regions of the concerned position P1 are defined as the first scan set A1 by the control unit 30 according to the concerned information. That is, the first scan set A1 contains the scan regions R14, R24, R34 and R44.

For shortening the scanning period, the scan strategy for scanning the scan regions other than the first scan set A1 is different from the first scan strategy. For example, as shown in FIG. 2, the scan regions that are not related to the concerned position P1 are defined as a second scan set A2 by the control unit 30. Then, the control unit 30 controls the fingerprint sensors 20 corresponding to the second scan set A2 according to a second scan strategy.

In this embodiment, the scan regions excluding the first scan set A1 belong to the second scan set A2. For example, the second scan set A2 contains the scan regions R11~R43 and the scan regions R15~R45. In an embodiment, the scanning speed corresponding to the first scan strategy and the scanning speed corresponding to the second scan strategy are different. Especially, the scanning speed corresponding to the second scan strategy is faster than the scanning speed corresponding to the first scan strategy. After receiving the concerned information, the control unit 30 controls the corresponding fingerprint sensors 20 to scan the ROI area at the scanning speed that is sufficient to clearly identify the fingerprint sensing result. In contrast, the control unit 30 controls the corresponding fingerprint sensors 20 to scan the non-ROI area at the faster speed. Consequently, the scanning period of the non-ROI area is largely shortened.

For example, after the concerned information is received by the control unit 30, the control unit 30 judges that the scan regions R11, R21, R31, R41, R12, R22, R32, R42, R13, R23, R33, R43, R15, R25, R35 and R45 are not included in the ROI area. Consequently, these scan regions are defined as the second scan set A2. Then, the control unit 30 controls the fingerprint sensors 20 corresponding to the second scan set A2 to scan these scan regions according to the second scan strategy (i.e., at a faster speed). Moreover, the control unit 30 judges that the scan regions R14, R24, R34 and R44 are included in the ROI area. Consequently, these scan regions are defined as the first scan set A1. Then, the control unit 30 controls the fingerprint sensors 20 corresponding to the first scan set A1 to scan these scan regions according to the first scan strategy. That is, these scan regions are scanned at the scanning speed that is sufficient to clearly identify the fingerprint sensing result.

As shown in FIG. 1B, the scan driving module 13 includes a plurality of shift registers 130. The plurality of shift registers 130 are located at bilateral sides of the display panel 12 and the touch panel 11. Moreover, these shift registers 130 are electrically coupled to the plurality of fingerprint sensors 20 in a plurality of rows. Consequently, a plurality of horizontal scan lines are defined. For example, as shown in FIG. 1B, the horizontal scan line SL0 in the horizontal direction indicates the fingerprint sensors 20 in a specified row from right to left.

According to the current digital circuitry technology about the shift registers, the fingerprint sensors in the same horizontal scan line are driven to scan the corresponding scan regions from left to right at the same pulse width. As shown in FIG. 2, the concerned position P1 is included in the scan region R34, but not included in the scan regions R14, R24 and R44. However, since the fingerprint sensors corresponding to the scan regions R14, R24, R34 and R44 are arranged along the same horizontal scan line (e.g., the same horizontal scan line SL1), the scan regions R14, R24 and R44 are related to the concerned position P1. Consequently, the scan regions R14, R24, R34 and R44 belong to the same scan set.

Figure 4:
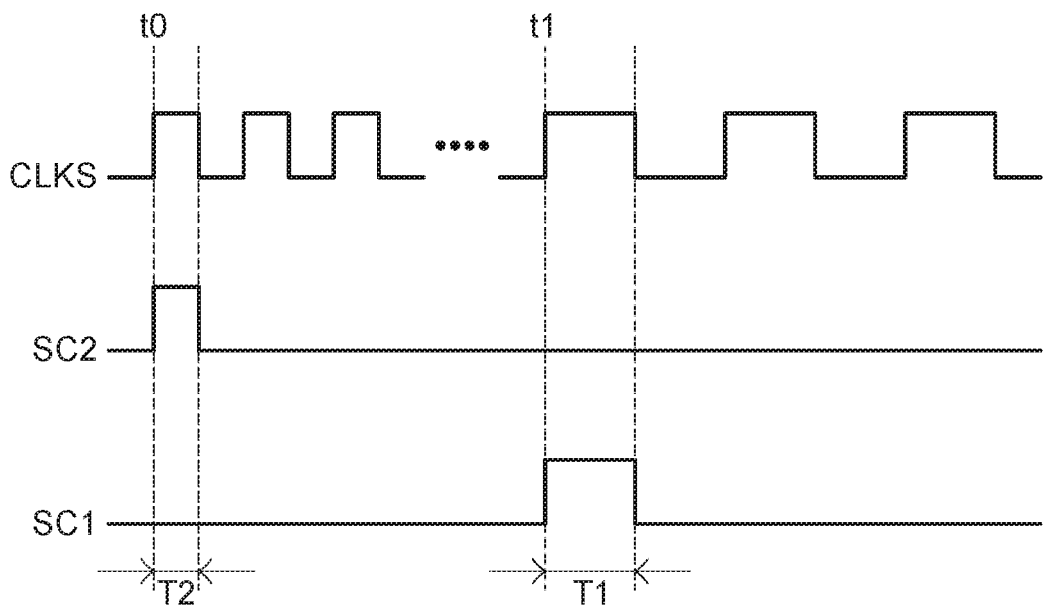
FIG. 4 is a waveform diagram illustrating the time sequence of the signals for driving the fingerprint sensors corresponding to the first scan set and the second scan set according to the embodiment of the present invention.

FIG. 4 is a waveform diagram illustrating the time sequence of the signals for driving the fingerprint sensors corresponding to the first scan set and the second scan set according to the embodiment of the present invention. In FIG. 4, a clock signal CLKS with two different pulse widths is shown. That is, the clock signal CLKS contains a horizontal scanning signal SC2 with a narrower pulse width T2 (at t0) and a horizontal scanning signal SC1 with a wider pulse width T1 (at t1). The horizontal scanning signal SC2 denotes the second scan strategy for driving the fingerprint sensors corresponding to the second scan set A2 (for example the fingerprint sensors along a horizontal scan line SL2 as shown in FIG. 2). The horizontal scanning signal SC1 denotes the first scan strategy for driving the fingerprint sensors corresponding to the first scan set A1 (for example the fingerprint sensors along a horizontal scan line SL1 as shown in FIG. 2). Since the pulse width T2 is narrower than the pulse width T1, the scanning period of second scan set A2 is shorter and the scanning speed is faster. The first scan set A1 is related to the ordinary scanning operation.

For example, when the control unit 30 generates the clock signal CLKS to control the scan driving module 13 according to the concerned information, the scan driving module 13 issues the horizontal scanning signals SC1 and SC2 to the horizontal scan lines SL1 and SL2, respectively. For brevity, only the two horizontal scan lines SL1 and SL2 are shown in FIG. 2. Since the scan driving module 13 includes a plurality of shift registers 130 (see FIG. 1B), the plurality of shift registers 130 issue the horizontal scanning signals to the corresponding horizontal scan lines at different time points.

For example, if the pulse width T2 is only a half of the pulse width T1, the implementation time of the horizontal scanning signal SC2 is a half of the implementation time of the horizontal scanning signal SC1. Consequently, the time period of scanning the horizontal scan line SL2 is only a half of the time period of scanning the horizontal scan line SL1. In other words, the speed of scanning the non-ROI area is twice the speed of scanning the ROI area, and the overall scanning period of all fingerprint sensors is a half of the scanning period of the conventional sensing technology. Of course, in case that the pulse width is reduced, the scanning speed is increased and more scanning period is saved.

It is noted that numerous modifications and alterations may be made while retaining the teachings of the invention. For example, the scanning operation is executed on the ROI area only, but the scanning operation is not executed on the non-ROI area. In other words, the scanning operation is executed according to the first scanning strategy, and the scanning operation is not executed according to the second scanning strategy. Consequently, the fingerprint sensors corresponding to the first scan set according to a first scan strategy are enabled to scan at the ordinary speed according to the first scanning strategy, but the fingerprint sensors corresponding to the second scan set are disabled according to the second scanning strategy.

Figure 5:
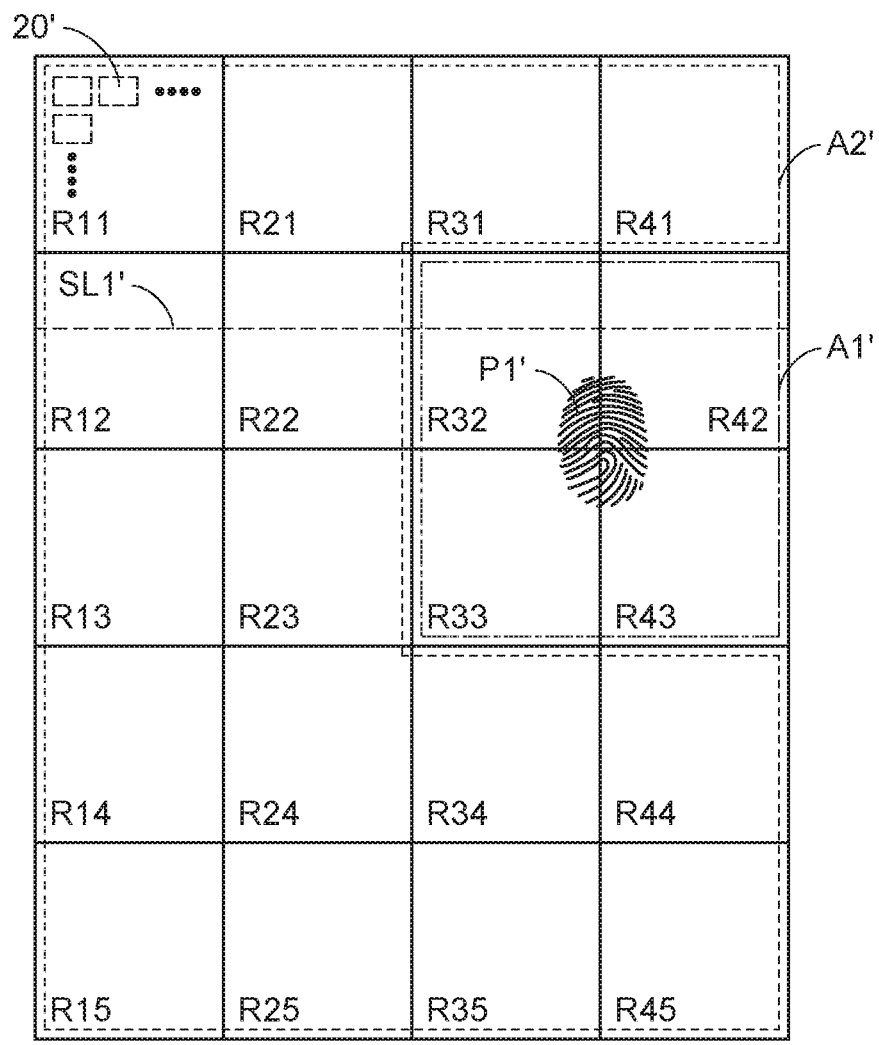
FIG. 5 schematically illustrates the distribution of scan regions defined by a fingerprint sensing method according to another embodiment of the present invention.

FIG. 5 schematically illustrates the distribution of scan regions defined by a fingerprint sensing method according to another embodiment of the present invention. Like the embodiment of FIG. 2, the plurality of fingerprint sensors 20 are distributed into a plurality of scan regions R11~R45 in an array. In comparison with the above embodiment, the concerned position P1' of this embodiment corresponds to more than one scan region. As shown in FIG. 5, the concerned position P1' belongs to the scan regions R32, R42, R33 and R43. In this embodiment, the ROI area is subjected to subdivision. For example, the scan regions of the concerned position P1' include the scan regions R32, R42, R33 and R43, which are defined as a first scan set A1'. In contrast, the scan regions R12, R22, R13 and R23 beside the first scan set A1' belong to a second scan set A2'.

As mentioned in the example of FIG. 2, the fingerprint sensors in the same horizontal scan line are driven to scan the corresponding scan regions from left to right at the same pulse width. Whereas, in the example of FIG. 5, the scan regions in the same horizontal scan line corresponding to the non-ROI area are determined. Consequently, the number of the fingerprint sensors to be controlled according to the first scan strategy is decreased. In addition, the fingerprint sensors corresponding to the non-ROI area are controlled according to the second scan strategy. Similarly, according to the first scan strategy, the corresponding fingerprint sensors are controlled to scan the ROI area at the scanning speed that is sufficient to clearly identify the fingerprint sensing result. Since the scanning speed corresponding to the second scan strategy is faster than the scanning speed corresponding to the first scan strategy, the overall scanning period is further shortened.

In other words, some horizontal scan lines are shared by the first scan set A1' and the second scan set A2'. In the example of FIG. 5, the horizontal scan line SL1' is shared by the first scan set A1' and the second scan set A2'. The shared horizontal scan line corresponds to the scan regions in the same rows with the scan regions R12 and R13 from left to right. Although the same horizontal scan line is shared by these scan regions, the fingerprint sensors corresponding to these scan regions are controlled according to different scan strategies. That is, the four scan regions R12, R22, R13 and R23 in the left side and the four scan regions R32, R42, R33 and R43 in the right side belong to different scan sets. Moreover, the fingerprint sensors corresponding to different scan set are controlled according to different scan strategies.

From the above descriptions, the fingerprint sensing method of the present invention is effective to overcome the drawbacks of the conventional technologies. That is, the scanning period is shortened according to the fingerprint sensing method of the present invention. The area where the user's finger is placed is the ROI area. The fingerprint sensors are controlled to scan the ROI area at the scanning speed that is sufficient to clearly identify the fingerprint sensing result. The speed of scanning the non-ROI area is different from the speed of scanning the ROI area. As a consequence, the overall scanning period is effectively shortened.

While the invention has been described in terms of what is presently considered to be the most practical and preferred embodiments, it is to be understood that the invention needs not be limited to the disclosed embodiments. On the contrary, it is intended to cover various modifications and similar arrangements included within the spirit and scope of the appended claims which are to be accorded with the broadest interpretation so as to encompass all modifications and similar structures.

What is claimed is:

1. A fingerprint sensing method for a frill-screen electronic device, the frill-screen electronic device comprising a panel module, a plurality of fingerprint sensors and a control circuit, the panel module including a display module and a touch panel, the plurality of fingerprint sensors being aligned with the panel module, distributed in an array, and corresponding to a plurality of scan regions, respectively, the control circuit being electrically coupled to the plurality of fingerprint sensors, the fingerprint sensing method comprising steps of:
   the touch panel generating a concerned information when a user's finger is placed at a concerned position on the display module;
   the control circuit receiving the concerned information from the panel module, and defining a first scan set of scan regions among the scan regions to be related to the concerned position and a second scan set of scan regions among the scan regions to be unrelated to the concerned position according to the concerned information; and
   the control circuit controlling the fingerprint sensors corresponding to the first scan set of scan regions according to a first scan strategy, and controlling the fingerprint sensors corresponding to the second scan set of scan regions according to a second scan strategy, wherein the second scan strategy uses a higher scan speed than the first scan strategy does.

2. The fingerprint sensing method as claimed in claim 1, wherein the touch panel is aligned with the display panel, the distributed scan regions corresponding to the plurality of fingerprint sensors are aligned with a touch control area of the touch panel, and the panel module further comprises a scan driving module, which is electrically coupled to the plurality of fingerprint sensors and the control circuit.

3. The fingerprint sensing method as claimed in claim 2, wherein when a finger is placed on the touch panel, the touch panel generates the concerned information.

4. The fingerprint sensing method as claimed in claim 2, wherein the scan driving module comprises a plurality of shift registers, and the plurality of shift registers are electrically coupled to the plurality of fingerprint sensors to define a plurality of horizontal scan lines.

5. The fingerprint sensing method as claimed in claim 4, wherein each scan region is aligned with more than two of the horizontal scan lines.

6. The fingerprint sensing method as claimed in claim 4, wherein at least one of the horizontal scan lines is shared by the first scan set and the second scan set.

7. A full-screen electronic device with a fingerprint sensing function, the full-screen electronic device comprising:
   a panel module comprising a touch panel generating a concerned information about a concerned position on the panel module;
   a plurality of fingerprint sensors located under the panel module, distributed in an array, and corresponding to a plurality of scan regions, respectively;
   a control circuit electrically coupled to the panel module and the plurality of fingerprint sensors, and receiving the concerned information from the panel module for controlling the plurality of fingerprint sensors,
   wherein after the control circuit receives the concerned information from the panel module, the control circuit defines a first scan set of scan regions among the scan regions to be related to the concerned position and a second scan set of scan regions among the scan regions to be unrelated to the concerned position according to the concerned information, and controls the fingerprint sensors corresponding to the first scan set of scan regions according to a first scan strategy, while controlling the fingerprint sensors corresponding to the second scan set of scan regions according to a second scan strategy, wherein at least one horizontal scan line is shared by the first scan set of scan regions and the second scan set of scan regions and the second scan strategy uses a higher scan speed than the first scan strategy does.

8. The full-screen electronic device as claimed in claim 7, wherein the panel module comprises:
   a display panel;
   a touch panel aligned with the display panel, wherein the distributed scan regions corresponding to the plurality of fingerprint sensors are aligned with a touch control area of the touch panel; and
   a scan driving module electrically coupled to the plurality of fingerprint sensors and the control circuit.

9. The full-screen electronic device as claimed in claim 8, wherein when a finger is placed on the touch panel, the touch panel generates the concerned information.

10. The full-screen electronic device as claimed in claim 8, wherein the scan driving module comprises a plurality of shift registers, and the plurality of shift registers are electrically coupled to the plurality of fingerprint sensors to define a plurality of horizontal scan lines.

11. The full-screen electronic device as claimed in claim 10, wherein each scan region is aligned with more than two of the horizontal scan lines.

* * * * *